2,714,964
LIQUID FILTER
Paul S. Radford, Compton, Calif.
Application February 24, 1953, Serial No. 338,190
4 Claims. (Cl. 210—131)

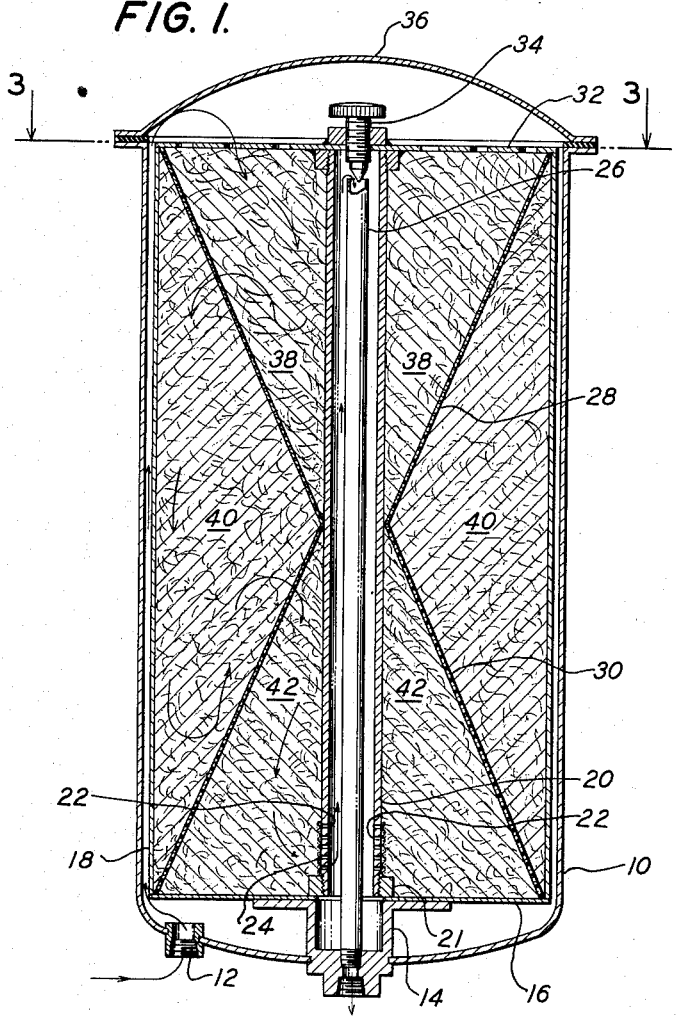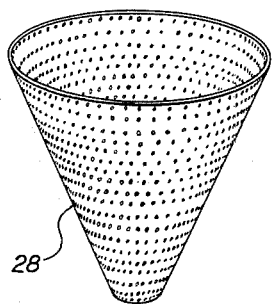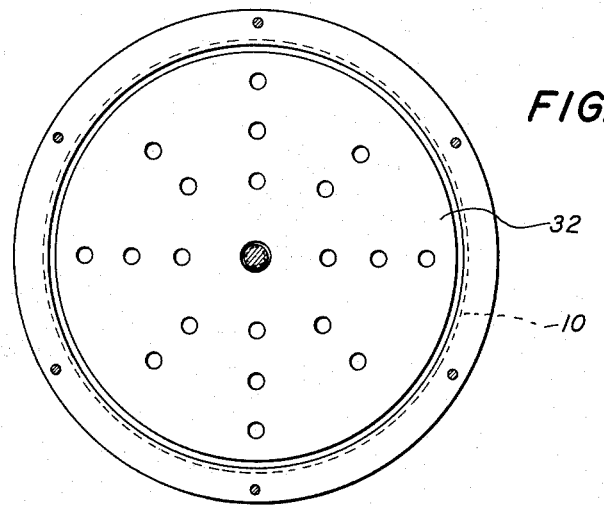
Aug. 9, 1955 — P. S. RADFORD — 2,714,964
LIQUID FILTER
Filed Feb. 24, 1953
FIG. 1.
FIG. 2.
FIG. 3.
INVENTOR.
PAUL S. RADFORD
BY
ATTORNEY United States Patent Office 2,714,964
Patented Aug. 9, 1955

This invention relates to improved filter devices for liquid lubricants.

Conventional filter devices generally pass a lubricant through the filtration medium by a path of a length that is at best equal to the length of the container. As solids deposit throughout the medium and on the bottom, both the efficiency of the medium as a filter and the length of the effective filtration path decrease. In addition, as they become laden with solids they offer considerably more resistance to fluid flow. Most filters require a tightly packed, precisely manufactured filter medium. Prior designs have not made the use of easily replaced, cheap fiber wastes and the like as filter media practicable.

The present invention provides a filter which is easily disassembled, cleaned, packed and reassembled. It may use inexpensive waste material as a filter medium. By means of internal dividers of unique design a longer effective filtering path is obtained in a container of given size. Use of looser packing causes solids to accumulate in out of the way regions, producing a cleaner lubricant, allowing longer use without replacing the packing, and presenting less resistance to fluid flow as solids accumulate.

The design and operation of this filter will be understood from the following detailed description of the presently preferred embodiment of this invention with particular reference to the drawings in which:

Fig. 1 is a sectional side view of the presently preferred embodiment of this invention;

Fig. 2 is a view of one of the frusto conical dividers employed in the apparatus of Fig. 1; and Fig. 3 is a top view of the upper cover of the filter cartridge of Fig. 1.

With reference to Fig. 1 a conventional drum 10 provides the outer container for the filter assembly. Lubricant to be filtered enters the drum at the bottom through a port 12. Piercing the drum and attached to it at the center of the bottom of the drum is an annular flanged support member 14 upon which the internal parts of the filter are supported. A solid annular base plate 16 rests upon the flanged support member. To the outer periphery of the base plate 16, a cylinder 18 is welded or brazed in a fluid-tight manner thus providing a container for the filter medium. The outer radius of cylinder 18 is less than the internal diameter of drum 10 by an amount less than 2% of the outer radius of cylinder 18. For reasons not completely understood, this dimension is critical, and best results are not obtained if the space is much larger than the 2% value given above, and it is preferably less.

A vertical pipe 20 is threaded into a raised annular boss 21 which is brazed onto the center of face plate 16. This pipe 20 serves as a spindle for the assembly of the other parts of the filter. Near the bottom of pipe 20 passageways 22 are drilled and covered with a mesh screen 24. Another vertical tube 26 extends vertically inside pipe 20, threadably mounted in flanged support member 14 and closely fitting the hole in annular base plate 16. Two frusto conical sections 28 and 30 as illustrated in Fig. 2 are placed in the cylinder with their narrow ends together at the center. These sections are pierced with $1/16$ inch holes, 91 per square inch, and offer relatively more resistance to liquid flow than the waste packing later to be described.

An annular top plate 32, perforated with 20 ½ inch holes as indicated in Fig. 3 is threadably mounted on the upper end of pipe 20 and seals off the edges of the filter cylinder. A needle valve 34 is mounted upon this plate, extending into tube 26 to control the rate of lubricant flow. A cover 36 is mounted on drum 10.

The frusto conical sections 28 and 30 divide the filter medium into three zones, 38, 40 and 42. As the filter is assembled, each zone is loosely packed with chemically treated sterilized cotton waste. The lubricant, after entering port 12 and reaching the top of the cylinder, flows into the filtering medium. It is an advantage of this invention that in zone 38 for example, solids, instead of remaining dispersed through the filter, largely settle to the apex of the conical section and do not contribute to lessening the efficiency or shortening the effective path of the filter. An important feature of this invention is that fluid flow tends to take the path as indicated by the arrows in Fig. 1 because the conical sections offer relatively greater resistance to hydraulic flow than the waste packing, particularly as the solids begin to accumulate in the lower section of each zone. Most of the fluid escapes through the conical section near the top of zone 38, and again because the packing is the path of least resistance, flows next to the bottom of zone 40, where solids are mostly deposited at the bottom edge as in the case of zone 38. Fluid then escapes into zone 42 mostly near the apex of the cone defining the lower section, where it flows downward to escape through the holes in pipe 20 then upward in pipe 20 past needle valve 34 and down tube 26 to return to the lubrication system. It will be observed that the effective path is much longer than for a "straight through" filter, and that even when the filter is nearly full of filtered solids, the path is at least as long as that found in conventional filters with new filter elements.

I claim:

1. In a lubricant filter comprising a drum, a conduit connected to the drum for supplying lubricant to be filtered to the interior of the drum, and an outlet pipe projecting into the drum and affixed thereto, the combination which comprises an annular container adapted for disposition in the drum around the outlet pipe, the container being closed at one end and being provided with openings at the other end for the entrance of the lubricant, the inner annular wall of the container being provided with at least one opening near the closed end of the container for the escape of the lubricant, two perforated frusto-conical members of altitude approximately equal to half the altitude of the container disposed in the container with their small ends together and extending substantially across the annular cross section with the axis of the members transverse to said cross section, and a porous packing disposed in the container on all sides of the frusto-conical members.

2. In a lubricant filter comprising a drum, a conduit connected to the drum for supplying lubricant to be filtered to the interior of the drum, and an outlet pipe projecting into the drum and affixed thereto, the combination which comprises an annular container adapted for disposition in the drum around the outlet pipe, the container being closed at one end, the other end being a plate threaded for attachment to the pipe and having openings for the entrance of the lubricant into the container, the inner annular wall of the container being provided with at least one opening near the closed end of the container for the escape of the lubricant, two perforated frusto-conical members of altitude approximately equal to half the altitude of the container disposed in the container with their small ends together and extending substantially across the annular cross section with the axis of the member transverse to said cross section, and a porous packing disposed in the container on all sides of the frusto-conical members.

3. In a lubricant filter comprising a drum, a conduit connected to the drum for supplying lubricant to be filtered to the interior of the drum, and an outlet pipe projecting into the drum and affixed thereto, the combination which comprises an annular container adapted for disposition in the drum around the outlet pipe, the container being closed at one end and being provided with openings at the other end for the entrance of the lubricant, the inner annular wall of the container being provided with at least one opening near the closed end of the container for the escape of the lubricant, two perforated frusto-conical members of altitude approximately equal to half the altitude of the container disposed in the container with their two small ends together and extending substantially across the annular cross section with the axis of the members transverse to said cross section, a porous packing disposed in the container on all sides of the frusto-conical members, the perforations in the conical members being of such size and number that relatively more resistance is offered to hydraulic flow by the conical members than by the packing.

4. In a lubricant filter comprising a drum, a conduit connected to the drum for supplying lubricant to be filtered to the interior of the drum, and an outlet pipe projecting into the drum and affixed thereto, the combination which comprises an annular container adapted for disposition in the drum around the outlet pipe, the container being closed at one end and being provided with openings at the other end for the entrance of the lubricant, the distance between the outer radius of the container and the inner radius of the drum being between 1% and 2% of the outer radius of the cylinder, the inner annular wall of the container being provided with at least one opening near the closed end of the container for the escape of the lubricant, two perforated frusto-conical members of altitude approximately equal to half the altitude of the container disposed in the container with their two small ends together and extending substantially across the annular cross section with the axis of the members transverse to said cross section, a porous packing disposed in the container on all sides of the frusto-conical members, the perforations in the conical members being $1/16$ inch holes, 91 per square inch.

References Cited in the file of this patent

UNITED STATES PATENTS

| | | |
|---|---|---|
| 156,488 | Males | Nov. 3, 1874 |
| 2,014,445 | Miller | Sept. 17, 1935 |
| 2,168,124 | Hurn | Aug. 1, 1939 |
| 2,294,330 | Clark | Aug. 25, 1942 |
| 2,337,238 | Griffith | Dec. 21, 1943 |
| 2,427,320 | Zech | Sept. 9, 1947 |
| 2,487,146 | Lasky | Nov. 8, 1949 |